US008953008B2

(12) United States Patent
Goldau et al.

(10) Patent No.: US 8,953,008 B2

(45) Date of Patent: Feb. 10, 2015

(54) METHOD AND DEVICE FOR PRODUCING COLOR IMAGES ON SUBSTRATES CONTAINING COLOR BODIES AND PRODUCTS PRODUCED THEREBY

(75) Inventors: Rainer Goldau, Zurich (CH); Klaus Schafer, Zurich (CH); Ulrich Ritter, Nidda-Schwickartshausen (DE)

(73) Assignee: U-NICA Technology AG, Malans (CH)

( * ) Notice: Subject to any disclaimer, the term of this patent is extended or adjusted under 35 U.S.C. 154(b) by 0 days.

(21) Appl. No.: 13/988,930

(22) PCT Filed: Sep. 12, 2012

(86) PCT No.: PCT/EP2012/067769

§ 371 (c)(1), (2), (4) Date: Aug. 5, 2013

(87) PCT Pub. No.: WO2013/041415

PCT Pub. Date: Mar. 28, 2013

(65) Prior Publication Data

US 2014/0160220 A1 Jun. 12, 2014

(30) Foreign Application Priority Data

Sep. 20, 2011 (EP) .................................... 11182071

(51) Int. Cl.

*B41J 2/47* (2006.01)

*B41J 2/325* (2006.01)

(Continued)

(52) U.S. Cl.

CPC . *B41J 2/435* (2013.01); *B41M 3/14* (2013.01); *B41M 5/287* (2013.01); *B41M 5/34* (2013.01);

(Continued)

(58) Field of Classification Search

USPC ................................. 347/232, 262, 164, 172

See application file for complete search history.

(56) References Cited

U.S. PATENT DOCUMENTS 2,712,507 A 7/1955 Green 5,157,412 A * 10/1992 Kleinschmidt et al. ....... 347/232

(Continued)

FOREIGN PATENT DOCUMENTS

DE 29 07 004 B1 8/1980

DE 199 00 145 A1 7/1999

(Continued)

OTHER PUBLICATIONS

International Search Report and Written Opinion dated Oct. 9, 2012, issued in International Application No. PCT/EP2012/067769.

(Continued)

*Primary Examiner* — Sarah Al Hashimi

(74) *Attorney, Agent, or Firm* — Sughrue Mion, PLLC

(57) ABSTRACT

A method for producing images (8) on a substrate (2) with colour bodies thereon, the colour bodies losing a colour effect due to a laser (23) and consisting of dyes or pigments contained in capsules (1). Different colour bodies having at least three different colour effects are on or in the substrate (2). The method includes: (a) producing a colour chart (14), with individual colour effect of individual colour bodies contained as a function of the spatial coordinates thereof on or in the substrate; and (b) spatially resolving radiation, which opens the colour effect of colour bodies of individual capsules and releases dyes by a laser (23) at a single frequency on the basis of the colour chart (14) in order to produce a resultant colour effect. Substrates, like security documents, can be produced this method.

14 Claims, 8 Drawing Sheets

(51) Int. Cl.

| | |
|---|---|
| ***G01D 15/06*** | (2006.01) |
| ***B41J 2/435*** | (2006.01) |
| ***B41M 3/14*** | (2006.01) |
| ***B41M 5/28*** | (2006.01) |
| ***B41M 5/34*** | (2006.01) |
| ***B42D 25/00*** | (2014.01) |

(52) U.S. Cl.

CPC ............ *B42D 15/10* (2013.01); *B42D 2031/08* (2013.01); *B42D 2035/06* (2013.01); *B42D 2035/34* (2013.01)

USPC ............ 347/232; 347/172; 347/164; 347/262

(56) References Cited

U.S. PATENT DOCUMENTS

| | | | | |
|---|---|---|---|---|
| 6,002,695 | A | 12/1999 | Alfrey et al. | |
| 7,292,231 | B2 * | 11/2007 | Kodama et al. | 345/173 |
| 2001/0003730 | A1 | 6/2001 | Suzuki et al. | |
| 2002/0089580 | A1 * | 7/2002 | Suzuki et al. | 347/172 |

FOREIGN PATENT DOCUMENTS

| | | | |
|---|---|---|---|
| EP | 0 279 104 | A1 | 8/1988 |
| EP | 1 008 459 | A1 | 6/2000 |
| EP | 1 380 902 | A1 | 1/2004 |
| EP | 1 574 359 | A2 | 9/2005 |
| EP | 2 168 780 | A2 | 3/2010 |
| WO | 01/15910 | A2 | 3/2001 |
| WO | 01/36208 | A2 | 5/2001 |
| WO | 03/040825 | A1 | 5/2003 |

OTHER PUBLICATIONS

Norrman et al. "6 Studies of Spin-Coated Polymer Films," Annu. Rep. Prog. Chem., Sect. C: Phys. Chem., 2005, 101, pp. 174-201.

Rauch-Puntigam et al., "Acryl- und Methacrylverbindungen," Chemie, Physik und Technologie der Kuntstoffe in Einzeldarstellungen. (Chemistry, Physics and Technology of Plastics in Individual Presentations). Hrg. K.A. Wolf, Springer Publishing House. 1967, pp. i-xviii.

Meissner, "Photokatalytische und Photoelektrochemische Abwasserreinigung," (Photocatalytic and Photoelectrochemical Wastewater Purification), 4th Ulmer Electrochemical Days, 1997, pp. 222-233.

International Preliminary Report on Patentability, dated Apr. 3, 2014, issued by the International Searching Authority, in counterpart Application No. PCT/EP2012/067769.

* cited by examiner 31
31
31
55
56
57

31
31
55a
41
56
57

31
55b
56a
41
41
57

55c
56b
57a
41
41
41

METHOD AND DEVICE FOR PRODUCING COLOR IMAGES ON SUBSTRATES CONTAINING COLOR BODIES AND PRODUCTS PRODUCED THEREBY

CROSS REFERENCE TO RELATED APPLICATIONS

This application is a National Stage of International Application No. PCT/EP2012/067769, filed on Sep. 12, 2012, which claims priority from European Patent Application No. 11 182 071.8 filed on Sep. 20, 2011, the contents of all of which are incorporated herein by reference in their entirety.

TECHNICAL FIELD

The present invention relates to methods for improved generation of high-gloss colour images protected against forgery on substrates, devices for carrying out methods of this type, and also products produced with use of methods of this type, in particular such as secured documents, for example personalised pages for passports, identity cards and other identification cards, etc.

PRIOR ART

Data carriers in the form of identification cards, personalised pages or personalised inlays for passports, or also credit cards and similar plastic cards nowadays have to have a high level of protection against forgery. There are a large number of various types of security features and specific printing methods, which can ensure such a level of protection against forgery to a certain extent. Here, a significant challenge is not only to provide non-individualised security features, but in particular security features that are combined to a certain extent with the personalisation or are part thereof.

It is for example known from DE-A-2907004 that not only can images in identification cards be generated using a laser beam, but of course also other visually recognisable information, such as signs, patterns, etc. In the above document, the functional layer, from which the final image or an arbitrary visible symbol or sign is produced during the course of the method, consists of a thermosensitive layer. This functional layer extends over the card over an area segment, on which the image or another visually recognisable piece of information is to be located subsequently. The functional layer is normally bonded with other plastic layers, from which the finished card is produced in the form of a film laminate during the course of the card production process. In this case, the image is burned in, wherein the intensity of the laser beam is accompanied by a darkening of the irradiated location. Black and white images or greyscale images are nowadays produced routinely in this manner. The advantage of this "laser engraving" process already identified early on lies in the high level of protection against forgery and resistance to light and mechanical stress of cards produced in this way, in particular when said cards consist of polycarbonate. This is confirmed for example by EP-A-1574359 or EP-A-1008459. Security documents produced with the aid of laser engraving on polycarbonate laminates meet international requirements for travel documents (ICAO Doc. 9303 Part III Volume I) or even exceed these requirements. It is a disadvantage of the method that the colour changes thus achieved only allow the production of substantially monochrome images. Besides the change from white to black, colour changes from white to brown, from pink to black and yellow to reddish brown are also known.

For obvious reasons, there is great interest in the production of high-quality colour images based on a laser-based process, and also a need for identification cards produced in this way.

A concept based on the irradiation of a plurality of coloured components (colour bodies) of different colour consisting of pigments or dyes or mixtures of dyes and pigments takes in to account this fact. The chromophoric components of different colours must together produce a colour space that consists of a plurality of primary colours, typically of at least three primary colours. For practical reasons, the primary colours cyan [C], magenta [M] and yellow [Y] are preferred. Other colours are also conceivable however, for example red [R], green [G] and blue [B]. The primary colours must also have an absorption spectrum that allows an interaction with coloured laser light. Naturally, these colours are from the RGB system, whereby, in practice, there is a partial incompatibility or non-ideal interaction between the coloured components from the CMY system and the laser wavelength selected for the absorption maximum. In contrast to the previously mentioned method of carbonisation of initially invisible components, this method presents colouration by means of bleaching, that is to say lightening, a colour visible prior to irradiation. The substrate appears as a result of the visible mixing of the coloured components prior to irradiation in a very dark, ideally black, tone. Such a method is described for example in WO-A-0115910. In spite of the advantages that this invention potentially offers, specifically the further increased level of protection against forgery as a result of a coloured representation of the document owner, the method described in the above document and the products produced thereby have disadvantages under some circumstances, which limit the practical value thereof for certain applications. The disadvantages lie on the one hand in the complexity of the pigment formulation in the layer(s) to be decoloured on the card or the data carrier, and on the other hand in the residual absorption of the destroyed colour bodies, which presents itself in a yellowish colour tone. These disadvantages make it possible to produce a purely white or purely black image only to a limited extent. In addition, the absorption spectra of the most commonly used coloured components are created such that, to a certain extent, there is an undesired interaction between a chromophoric component having a laser wavelength other than the desired laser wavelength. This effect may then be problematic when pigments of different colours are arranged in the effective cross section of the laser beam combined from three wavelengths. This above-mentioned non-ideality between absorption spectrum and the exciting laser wavelength manifests itself by a spectral crosstalk of the otherwise dye-specific laser bleaching. This results in a reduced image quality in the form of a chroma noise and a non-neutral reproduction of the colour tone. In addition, the adjustment and control of a plurality of coincident laser beams may be elaborate in practice and may cause colour and image errors if carried out incorrectly.

A possible form of implementation of an irradiation device of this type is described in WO-A-0136208. By optimising various parameters, the reduction in quality can be kept within limits. Due to its complexity with regard to achieving the required result, the method still remains difficult to master. Lastly, the method has proven in practice to be comparatively costly due to the at least three laser devices required, and cannot be constructed easily as a compact unit together with the respective beam guidance arrangement.

A data carrier is disclosed from US 2002/0089580 A1, wherein a sign, pattern, symbol and/or image is produced on a substrate, wherein differently coloured colour bodies consisting of dyes or pigments are released from at least three different capsule types, which, after irradiation by specific laser radiation, produce a pressure or temperature change in the capsules until said capsules break open. The colour capsules are distributed uniformly over the substrate, in particular also in a manner lying one above the other. A disadvantage is that only the capsule content can be mixed with contents of adjacent capsules, but no other colour influence, such as bleaching, is provided. Intermediate shades of colours can only be produced by the integration capability of the eye of the observer. EP 0 279 104 A1 describes another procedure with the encapsulation of colour bodies; a developer is required, which is added into the product to be created in the substrate or the colour capsule casings or other capsule casings and may lead to an undesired release, for example as a result of pressure. It is a disadvantage that pastel colours mixed from full tones can only be produced by reducing the number of developed capsules. Intermediate shades of colours can only be produced by the integration capability of the eye of the observer.

A further document using microcapsules is WO 03/040825 A1, wherein, similarly to the other above-mentioned documents, no intermediate shades can be produced because an energy-dependent and time-dependent bleaching process is not provided. In particular, WO 03/040825 A1 states that the capsule walls are light-permeable for the releasing light.

The problem of the above-described methods and products for coloured laser bleaching ultimately lies in the fact that the production of colour images in identification cards and similar articles is not always possible in a quality accepted by the market, with the required mastery of the method, the justifiable costs and with the desired equipment set-ups.

For an appealing quality of the picture, a high resolution is necessary, and for example a requirement of 900 dpi could be demanded. The colour images are to be vivid and therefore demand a colouration that also enables intensive colours. Here, it is of course a technical disadvantage that with these image production methods only a third at most of the total area of the substrate is available.

DISCLOSURE OF THE INVENTION

Inter alia, one object of the invention is therefore to find for a data carrier, in particular a card-shaped data carrier for example, an image-producing laser method that allows the production of coloured images, symbols, texts, patterns, etc. in the required quality. A further object of the invention is to form the coloured images in accordance with this method using equipment or a system that meets the required criteria of investment costs, operating costs, compactness and robustness of the method. At the same time, the complexity of the method and of the products produced thereby ensures a high measure of protection against forgery. In a manner surprising for a person skilled in the art, the invention offers a solution for these and further objects, and results in a novel method, the products produced thereby, and the devices or systems required to carry out said method. It is also to be possible by means of the invention to depict full colours and also mixed tones in all nuances.

In accordance with the invention, the object is achieved in that, instead of the spectral separation of the primary colours, as described for example in WO-A-0115910 mentioned in the introduction with use of lasers of different frequency, a spatial resolution method is used with use of a single irradiation frequency, wherein the colour bodies are present in encapsulated form, that is to say are colour capsules so to speak with a latent colour effect. Here, in a first step, the location of any colour capsule with the colour bodies contained therein is established and said capsule is then opened in a location-specific manner by means of an excitation beam focused onto the colour capsules, for example a beam that is not necessarily monochromatic, for example from an IR laser, or from an IR-LED light beam. Multi-modal lasers, which are provided in particular as IR lasers, can also be used. Here, the application of energy focused onto the capsules is decisive. It is surprising that the microscopic analysis of the colour and position of all capsules with the contained colour components (or pigment grains) over the image field of a card-shaped data carrier, the subsequent storage of this data, and the corresponding control of a laser beam with a single irradiation frequency allows the production of a high-quality colour image (or of corresponding coloured symbols, texts, patterns, etc.), for example on a plastic laminate or another substrate with pigment particles stored accordingly therein or thereon.

Worded more generally, the present invention relates to a method for producing a sign, pattern, symbol and/or image in various colours on a substrate comprising colour capsules arranged on said substrate, wherein the colour effect is only possible, that is to say the desired colour impression is only identifiable with the naked eye, under the action of energy, for example of a laser, wherein different dyes or pigment particles having at least two or advantageously at least three, that is to say three or more, different colour effects are arranged on or in the substrate. The method is characterised by the following method steps, wherein these method steps can be provided before or after further method steps:

a producing a colour chart (mapping) with the position of any colour capsule with the colour of the colour bodies contained therein, wherein the position of a capsule and of the colour of the colour bodies contained therein is preferably established photometrically with the aid of an upwardly directed white light beam in a reflection measurement. A transmission measurement is also conceivable however, or even a non-photometric method. The coordinates of any colour capsule carrying a specific colour is thus known with the presence of the colour chart, wherein the colours remain visually hidden (that is to say hidden to the eye) due to the diffuse reflection of the ambient light onto the casings of the colour capsules;

b deliberate opening of selected colour capsules (release) with the objective at a specific location to generate a specific colour effect, wherein the opened colour capsules in their entirety produce a visible image on the substrate. The deliberate opening of a colour capsule is produced by a light beam, preferably of an IR laser, of which the diameter has to be collimated to a value that must be smaller than the diameter of a colour capsule, wherein the thermal effects causing the application of energy in the capsule casing initiate a cavitation dynamic, at the end of which the capsule casing ruptures. The procedure is also referred to or known as a photoacoustic process.

c Optionally a further step, which concerns the treatment of the released colour bodies (finishing) in order to change the colour tone or colour intensity thereof, or in order to improve the quality of the image produced by removing artefacts. For example, bleaching processes using lasers or an increase of the whiteness of the image background with the aid of oxidation means can be used for this purpose. In order to produce an accurate picture, for example of a person, but not necessarily a sign or symbol, this step is to be carried out in an obligatory manner.

With regard to the colour bodies that can be used within the scope of such a method, reference is made to systems as are described for example in WO-A-01/15910 and WO-A-01/

36208. Here, a multi-coloured sign, pattern, symbols and/or image is to be understood to mean a sign, pattern, symbol and/or image that not only comprises black and white and intermediate grey tones, but other colours, for example formed from C, Y and M, wherein, in the latter case, individual pigment particles should be provided with any of these three primary colours, and, where necessary, from special colours, such as a gold-coloured tone.

The invention therefore consists of a combination of some or all of the following elements:

- A local (geometric) separation of the encapsulated coloured components on the data carrier, which is used as a precursor for a security document. Here, the geometric separation of the coloured components preferably meets the basic requirement that each area element is covered only by one encapsulated coloured component and a minimum spacing exists between two encapsulated coloured components, that is to say an overlap or direct neighbouring of capsules of coloured bodies or clusters of coloured bodies is preferably avoided to the greatest possible extent. The encapsulated elements are applied in each case in the form of a monolayer to the substrate, such that the individual accessibility of each capsule for opening thereof is ensured; one layer of capsules at most is therefore arranged one above the other in plan view of the substrate.
- A device and a method that can find a specific encapsulated coloured component as a microscopically uniform entity, for example an encapsulated pigment grain or a cluster thereof, on the data carrier and that can characterise said component by its spatial coordinates and its colour (or the colour to be released). By means of systematic sweeping or scanning, the device makes it possible to chart the total number of all coloured components over the entire area of the subsequent image. Alternatively, it is also possible however to replace this information via a planar irradiation and a planar yet spatially resolved and colour resolved detection method, or to detect and provide the information directly during the process for producing the substrate.
- A device delivering an excitation beam, in particular a laser device, of which the beam exit optics can approach a capsule of a coloured component in an exact manner due to the known spatial coordinates, and, depending on the required colour intensity, can release this coloured component to the desired degree by destroying a predetermined number of identically coloured capsules, and also the method in order to carry out the release over individual capsules in a controlled manner using this laser device. As a capsule is destroyed, the complete colour content is always released and is distributed, which corresponds to the application of the functional principle of the dot matrix printing method. The possibility of using identical capsule casings in the case of the invention, which therefore exhibit no discrimination with regard to absorbed radiation, but release their content as a result of a breakage of the casing after a predetermined time with any type of radiation directed onto the individual capsules, is advantageous.
- A programmable controller for the spatial positioning of the laser optic and of the power controller of the beam so that each individual component is irradiated deliberately over the entire area covered by pigment particles (coloured components), such that an image is produced.
- And optionally a further laser arrangement in order to bleach the released colours and/or a device in order to chemically lighten the white background. Bleaching comprises a change of the absorption properties of the molecule without degradation or directly the degradation of the molecular structure.

The elements of the invention meet requirements for operating speed, economic viability, operating effort and reliability in order to produce an image with the aid of the invention under industrial requirements.

A first preferred embodiment of the proposed method is characterised in that steps a, b and optionally c are carried out in the same device and without intermediate manipulation or displacement of the substrate. In fact, the production of the colour chart is a step in which accurate positioning of the processed substrate is decisive for the success or failure of the subsequent processing by the laser. Accordingly, it is preferable, in particular in order to avoid a calibration between steps a, b and optionally c, to carry out both of steps a and b in the same device, where necessary with use of the same scanning device (for example linear displacement unit).

A further preferred embodiment of the proposed method is characterised in that the device for producing a colour chart and the laser optic are fixed in a stationary manner, and in that the substrate is moved relative thereto using a linear displacement unit. This variant is recommended in particular with lightweight substrates or such substrates of which the image field cannot be scanned over using a conventional movable laser beam guide (galvo mirror).

In accordance with the invention, only one capsule of a coloured component should be arranged in the beam cone or focus circle of the laser in any one specific period for the process of the capsule opening, wherein, in the same period, all other capsules with coloured components remain unaffected by the laser light. The distribution of the capsules of coloured components within the area region used as a basis for the image can be achieved by application by means of a printing method (for example intaglio printing, relief printing, flexographic printing, etc.). The imprint allows both a statistical distribution of the coloured components and a distribution in lines, circles or complex figures, such as guillochés. Viewing and comparing the distribution of the coloured components under microscope therefore enables, as an additional benefit, the verification of the distribution pattern within the context of an authenticity check. It is also possible to apply or imprint the capsules with coloured components in the form of microlettering, sequences of numbers and similar information so as to thus include hidden additional information in the image, for example a personalisation of the owner of the document or the serial number of the document.

In other words, a further preferred embodiment is characterised in that the capsules with pigment particles are arranged in a layer, preferably in a single layer, on and/or in the substrate, which itself may also be a composite of layers, and are distributed substantially randomly as a function of the spatial coordinates. In principle, the present invention differs substantially in this regard from other prior art approaches.

This is in contrast to solutions in which the dyes have to be applied in a manner sorted to a certain extent in terms of their colouring, for example in a fixedly predefined, typically regular pattern, so that the dyes can then be released in the knowledge of this regular arrangement (for example a stringing together of rectangles, which are each "filled" with different colours in numerous lines and rows). In the case of the approach proposed here, the distribution of the colours located in the capsules or of the pigments providing said colours is not predefined during the method for producing the untreated substrate, and said substrate can be produced in a very simple process. Only in the first processing step is the colour distribution or the distribution of the pigment particles releasing the colour established preliminarily to a certain extent and then processed accordingly in the second production step. This thus typically includes a method necessary with a fixed, systematic arrangement of pigments, for example by means of a precise printing method with a controlled, reproducible positioning of the grid points, such that the controller allows laser irradiation precisely in accordance with this predefined pattern, and the pattern of the irradiation in the register corresponds to the printed image. This randomness of the distribution and the use of the random distribution to produce the symbols/images/signs, etc. can also be used as a further security stage. If, for example, the random arrangement of the capsules producing an image with the dyes or pigment particles contained therein is stored in a database, the individualising information (image) is thus combined with a fingerprint (random distribution of the pigment particles producing the image), which enables a very high security level that essentially cannot be reproduced. A corresponding data carrier can be compared with the respective information in the database in the event of a check, and the authenticity can be determined unambiguously.

A further preferred embodiment of the proposed method is characterised in that the capsules with the different dyes are arranged in a layer, preferably in a single layer, on and/or in the substrate, and are arranged substantially regularly in a microscopic pattern, wherein the microscopic pattern may be an arrangement of straight or undulating lines, basic patterns or microlettering. A microscopic pattern of this type for example may be a specific lettering (for example a denomination or the like), and, because it also is virtually impossible to reproduce, may be used as an additional security feature verifiable only with a magnifying means.

A further preferred embodiment lies in the parallelisation of the method according to a and/or b and optionally c, that is to say in processing the substrate simultaneously over portions at a number of locations over the image area.

So many capsules are advantageously opened that the contained dye is distributed such that said dye is visible to the naked eye. The colour concentration in the capsules is advantageously such that the content of a single capsule after release thereof is identifiable to the eye. The effect may also only be produced however after release, that is to say opening, of a plurality of capsules. The number of capsules to be opened is also dependent on the nature of the substrate, which has a greater or lesser tendency to take up and therefore mask colour bodies in its surface. The sinking of colour bodies in the substrate, for example in the uppermost layer of a coated paper, in principle requires a calibration of the release method to the selected substrate if the quality of the image is to be optimal.

An advantage of the release of dyes from such opened capsules also lies in the fact that, with corresponding substrates suitable for distribution, that is to say in particular substrates having a capillary effect, a region extending far beyond the size of the capsule itself is then penetrated by the dye from a capsule. Due to the release of differently coloured dyes from adjacent capsules, a stain may then be produced, which produces an at least seemingly full-coloured image for the naked eye.

In diffusely reflected light, the capsules preferably appear not to be transparent, but white, and, in the event of irradiation with directed light, they are partly transparent in this respect so as to make it possible to produce the colour chart in a simple manner. The capsules may then also appear transparent in translucent light, such that the colour chart can be produced in transmitted light.

The excitation beam for opening the capsules can simultaneously be combined with a bleaching beam in the optionally subsequent finishing process, either simultaneously or in chronological sequence. With the use of a laser beam, this can open the capsules and also change, in particular bleach, the colour effect of the contained dye. Here, a single laser or a combination of differently coloured lasers can be used, in particular an IR laser and/or a UV laser.

The quality of a well-printed image or of an image produced by laser irradiation is assessed for example via the sharpness (visually identifiable diameter ratio in the 36-sector Siemens star of d=0.1D to d=0.001D, preferably d=0.05D to d=0.005D), the breadth of the colour dynamic or the number of visually identifiable different colour tones or grey tones (5 bit to 16 bit, preferably 6 bit to 8 bit), the colour neutrality (colour-matching proof) and the resolution (150 dpi to 1,000 dpi, preferably 300 dpi to 500 dpi). In the case of a printed resolution for example of 500 dpi, all coloured components have to be combined over an area of the produced pixel size of approximately 50 μm diameter. For practical implementation, the size of a chromophoric component or a colour body runs beyond a diameter of at most 16 μm to 25 μm depending on the printed pattern. Under consideration of a minimal spatial separation of the individual colour bodies, a size from 5 μm to 12 μm, preferably 8 μm to 12 μm, is required. A particle size in these orders of magnitude can be presented by known methods.

A further preferred embodiment of the proposed method is accordingly characterised in that the individual coloured capsules, provided the colour bodies are pigments, have pigment grains with a diameter that lies at least by one order of magnitude below the average diameter of a colour capsule, that is to say, in the case of an average capsule diameter of 5 μm to 10 μm, have a diameter of at best 1 micrometer, and in that they are substantially all arranged on or in the substrate, preferably separated individually laterally. This is achieved in particular preferably in a manner such that the average lateral distance between two capsules with dyes (or pigment particles) is greater than the average diameter of the colour capsules. Furthermore, the beam diameter of the laser beam (the beam diameter is taken here at the $1/e^2$ level, that is to say at approximately 13.5%) in step b is preferably smaller than the average mean capsule diameter, and in step c by contrast is greater, but no more than twice as large, as the mean diameter of the colour capsules. The beam diameter of the laser beam in step b preferably lies in the range of 1-5 μm, preferably in the range of 2-5 μm, in particular preferably in the range of 2-4 μm.

Within the scope of the invention, the term colour body is selected as a generic term and comprises pigments, pigment particles, dyes, in particular liquid dyes, dyes in suspension, etc. The excitation beam for capsule opening should have a different, preferably smaller, beam waist than the excitation beam for bleaching possibly provided by the same (or another) laser.

In accordance with the invention, a capsule of this size should be approached by a laser beam guide such that the laser optic can adopt a precise position before the colour body or galvo mirrors can steer the laser beam precisely onto the colour body. Furthermore, the beam diameter of the laser beam at the location of the capsule should be adjusted such that no interaction with adjacent capsules can occur. To this end, in the embodiment of the invention, the laser beam is focused in a suitable manner. The focus cannot fall below a certain size due to diffraction, but in practice for example can be easily adjusted for example to an area having a diameter in the order of the diameter of the capsules. The standard scientific literature reveals that focusing to <1 μm is possible. The energy beam for opening the capsules, for example a monochromatic laser beam, has a wavelength suitable for efficient opening, preferably in the UV range. A wavelength suitable with 1064 nm is generated for example by an Nd:YVO4 laser, which, in a subsequent bleaching process, can then supply the preferred UV radiation via a frequency triplication. U.S. Pat. No. 6,002,695 describes such a UV laser system. The energy output of the opening laser in the IR mode lies in the range from 0.1 to 100 μJ, wherein the wall material and the wall thickness of a capsule are decisive and smaller or larger energy values cannot be ruled out in order to ensure that the capsule is opened. In the UV mode for bleaching the colour bodies, the laser system should decouple power in the range from 0.2-0.5 watts, and should irradiate the colour body or the colour bodies over a period from 0.01 to 10 nanoseconds.

A laser optic can be positioned above a capsule using a precise linear displacement unit, as is offered for example by Heinrich Wolf, Eutin, Germany.

Before the capsules with the colour bodies are burst open as a result of irradiation with an excitation beam, which may be an (IR-)LED radiation or a laser irradiation due to a subsequent cavitation process corresponding to an acoustic shock wave (also photoacoustic effect), it may be necessary to chart the entirety of all capsules with colour bodies over the area covered by the capsules. This is carried out in accordance with the invention for example in step a using an analytic scanning method. Here, the position and colour of the individual capsules are established for example via the detection of characteristic points from the absorption or spread spectrum of the individual colour body with white light excitation. A suitable focus diameter is approximately one sixth of the diameter of a capsule. The white light beam, with the aid of the above-described linear displacement unit, scans the area covered by capsules and can thus separately excite all colour bodies in the capsules over this area and make them accordingly detectable by collection of the scattered or transmission light. The white light beam with the stipulated focus is preferably conveyed by a fibre optic, which for example may consist of an individual oligomode fibre, or from a bundle of oligomode fibres, for example having an individual fibre diameter from 10 to 15 μm. A colour body in a capsule in the focus of the exciting white light beam appears as a result of the character of the reflected or transmitted light, which makes it possible to establish both the position and also the colour of the colour body in the capsule. Depending on the primary colours and pigments used, the spectral analysis of a colour body in a capsule normally requires at least three characteristic values, which, by means of a logic comparison algorithm, give a value for the primary colour of the colour body. For example, the characteristic values can be detected simultaneously by three photodiodes with suitably selected colour filters. The position of all coloured components is detected in this way and thus stored to a certain extent as a chart in a database. The colour chart is used in the following step of opening the capsules for two-dimensional navigation of the laser optic or of the opening laser beam.

Accordingly, a further preferred embodiment of the proposed method is characterised in that, in order to carry out step a with use of the reflection light, the upper side of the substrate or, in the case of use of the transmission light, the underside of the substrate is scanned, preferably with use of a linear displacement unit comprising an artificial or natural white light source and/or detection unit (for example photodiodes), wherein, preferably as a function of the spatial coordinates, white light is irradiated and the reflected or transmitted light is analysed spectrally as a function of the spatial coordinates, preferably by establishing the signal exclusively at least at two, preferably at least at three, discrete frequencies, which make it possible to distinguish the different pigment particles in the capsules arranged in the substrate, preferably with use of a photodiode, and by determining the position and the respective colour effect of individual pigment particles in the capsules in a data matrix in the form of a data tuple forming the colour chart. A variant of the spectral analysis may also lie in the fact that, instead of the white light, a plurality of irradiations with light of different colours are carried out in quick succession within a temporary period of time. In other words, the colour of a colour body in a capsule can also be determined by means of a sequence of flashes of different frequency ranges, for example in the colours red, green and blue. In practice, this method for scanning an original with relatively low resolution is used in some flatbed scanners. In this case, it is not mandatory however for the analysis of the light to limit the spectral evaluation to one photodiode.

A further preferred embodiment is characterised in that, in order to carry out step b, the surface of the substrate is scanned, preferably with use of a linear displacement unit with laser source arranged thereon, by directing the laser source to individual pigment particles or clusters of pigment particles on the basis of the colour chart in order to individually destroy or activate the colour effect of said pigment particles.

Here, the same linear displacement unit as has already been explained above may preferably be used for the steps a, b and c.

Preceding from the colour chart produced in step a for the sign, pattern, symbol and/or image, a process protocol for the laser or the plurality of lasers can be produced in step b in a data processing unit, wherein said process protocol receives the information with regard to which individual pigment particles, as a function of the spatial coordinates, are to be influenced locally in a deliberate manner in terms of their colour effect by opening the corresponding capsule by means of the laser in order to generate a specific macroscopic colour effect for the sign, pattern, symbol and/or image.

Methods are therefore proposed for determining at microscopic level the smallest of capsules with particles of different colour, for recording and storing the colour and position of said capsules on an image field, and for subjecting the capsules to a subsequent selective treatment.

The primary application of the method consisting of the sub-methods of the analytical scan or the colour body charting and the release of the colour bodies by destroying the capsules surrounding them by means of an excitation beam, in particular a laser beam, lies in the production of an image on a substrate, for example a plastic card, preferably of a portrait image in a security document, such as an image on an ID card or on the personalised page of a passport. The sizes of the images decisive for most travel documents and further specifications for the plastic carrier are described in ICAO Document 9303, Part 3.

The card of coloured components, for example colour bodies, pigments, dyes, etc., produced digitally in accordance with this invention can also be used within the scope of use of a security document for verification thereof. Commercially available devices, such as digital microscopes, are sufficient in order to check the distribution pattern. It is also possible for verification purposes to use, besides the digital microscopes and other devices, electronically portable devices, such as mobile telephones and the optical recording devices thereof. In order to facilitate this, specific programs (apps) that can run on the portable devices or mobile telephones can be provided, which automatically compare a recording of this type via a mobile telephone connection, a wlan connection or a remote connection, for example via internet, with the information concerning the data carrier stored in a database and accordingly makes it possible to come to a conclusion regarding the authenticity, again output accordingly via the mobile telephone. The digital images produced in situ using these devices, for example in the form of JPG files, provide information concerning the authenticity of the document due to a comparison with the colour body chart of the document stored in a central database. The corresponding application programs can be installed both on the portable devices and on central servers. This authentication is of course possible for an individual document.

Furthermore, the present invention relates to a data carrier with a sign, pattern, symbol and/or image produced in accordance with a method as has been presented above. The data carrier according to the invention has, at any location, a predetermined arbitrary colour, irrespective of the applied colour capsule distribution. This is true in particular when the introduced image is subjected beforehand and/or subsequently to a lamination process. The data carrier with a sign, pattern, symbol and/or image produced in accordance with a method according to the invention advantageously appears to have a full-colour area. Such a full-colour area is characterised by a directly neighbouring positioning of flecks of colour in full colours or after carrying out a bleaching step of further intermediate shades, which, in contrast to a raster image, gives a colour impression over the entire area, which requires a lesser integration effect from the eye of the observer. The full-coloured effect is advantageous in view of the fact that, in the prior art, there is a ⅓ restriction to the effect that colour tuples generally consist of at least three colours, which therefore release only one third of the substrate area for a colour impression, in any case with a monolayer distribution of the colour capsules.

In accordance with a first preferred embodiment of a data carrier of this type, said data carrier is characterised in that it has been produced on the basis of a substrate with random arrangement of the capsules containing pigment particles, and in that the random arrangement and use thereof for production of the sign, pattern, symbol and/or image is stored on the data carrier and/or in a database in order to increase the level of security. Such a data carrier can then be distinguished microscopically from a conventional raster image, which can be used for a forensic authenticity check, in particular if the respective colour chart is stored on the data carrier or a database. In an advantageous embodiment, a data carrier is thus covered randomly with colour capsules and these are present only in one layer at most, that is to say substantially no colour capsules are arranged one above the other.

Such a data carrier is preferably an identification card, credit card, a passport, a pass or an identification label.

Furthermore, the present invention relates to a device for carrying out a method as has been described above, in particular characterised in that the device comprises means for securing or at least fixedly placing a substrate, a first unit for producing the colour chart of the substrate, and a second unit for spatially resolved irradiation by means of a laser at a single frequency on the basis of the colour chart, said irradiation releasing the colour effect of colour bodies just of individual capsules, in order to produce a resultant colour effect. The first and second unit may use the same linear displacement unit.

The device thus typically additionally has at least one data processing unit and at least one linear displacement unit, which can be controlled two-dimensionally by means of said data processing unit and which carries the first and/or the second unit.

In particular, a step c may advantageously be provided as a bleaching step of previously escaped colour bodies. This bleaching step can be implemented in many options. It can be provided after step b as a capsule opening step. In this case, all desired capsules of all colours are opened and the colour can distribute accordingly in the substrate. All opened capsules are then processed. Alternatively, the step c may be provided intermittently with step b after each individual capsule or after a predefined number of opened capsules. In other words, there is a repeating sequence of (step b and step c). Here, a step c can take place after said opening of a single capsule in each case, or it follows the opening of a number of capsules. In this case too, a maturing period may or may not be awaited, in which the colour bodies distribute in the substrate. If the period is not awaited, only the capsule casing just cracked then has to be irradiated, since the dye has not yet left the location in the substrate. If, by contrast a predefined period is to elapse, the bleaching can only be carried out incompletely using a beam also directed only to the previous capsule at the location of the capsule casing. In other words, with a predefined wait before the bleaching process, the achievable intensity of the bleaching process can be predetermined. The excitation beam of the bleaching operation may be the same as that when opening the capsules or may be a different beam. This step of bleaching may optionally be achieved in the guidance of the excitation beam by a) guiding the excitation beam as a bleaching beam for the colour area covered by the colour bodies by distribution, wherein the path is calculated based on the knowledge of the substrate, the capsules distributed there and the predetermined colour gradients over the entire colour area or parts of said colour area depending on the desired bleaching effect. Also, b) the excitation beam can be directed as a bleaching beam to the region of the respective opened capsule(s), wherein it is mapped thereonto and for example is focused onto twice or three times the area; wherein the colour quantity achieved is dependent on the aforementioned maturing time, that is to say the time between opening of the capsule and the bleaching step. In this case, the aforesaid charting from step a may optionally be used, and the bleaching step can be carried out at a predetermined interval after the opening of the capsule(s) in order to reach the entire exiting colour body or parts of the exiting colour body with the bleaching step.

Further embodiments are disclosed in the dependent claims.

BRIEF DESCRIPTION OF THE DRAWINGS

Preferred embodiments of the invention will be described hereinafter on the basis of the drawings, which are used merely for explanatory purposes and are not to be interpreted as limiting. In the drawings.

DESCRIPTION OF PREFERRED EMBODIMENTS

Figure 1A:
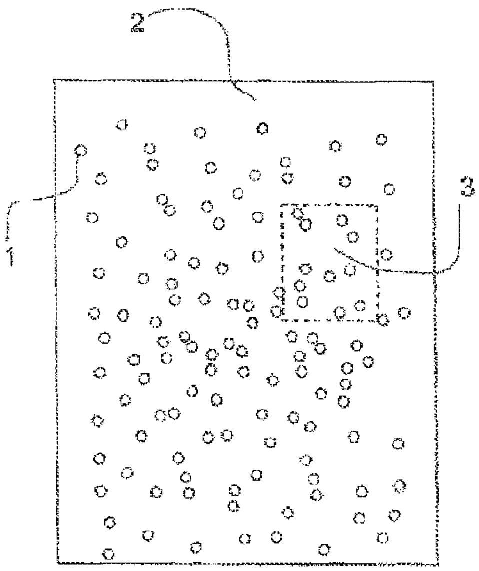
FIG. 1 shows a schematic illustration of possible encapsulated colour or pigment distributions on substrates, wherein in a) a statistical distribution, in b) a distribution in lines, in c) a distribution in the form of meanders, in d) a circular repeating distribution, and in e) a distribution in the form of microlettering is illustrated.
Figure 1B:
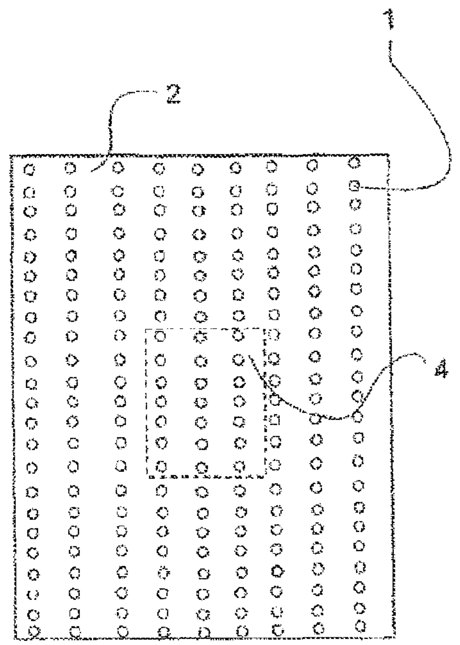
Figure 1C:
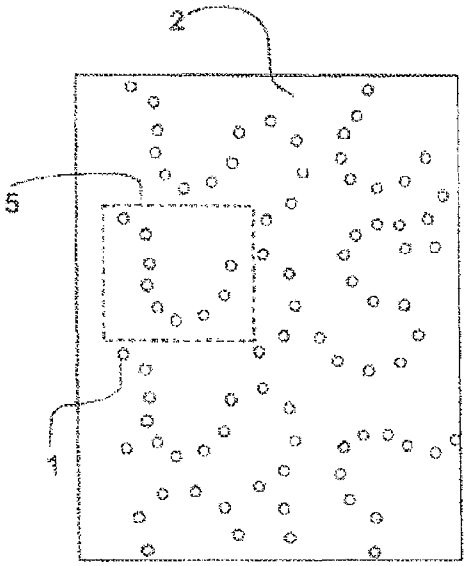
Figure 1D:
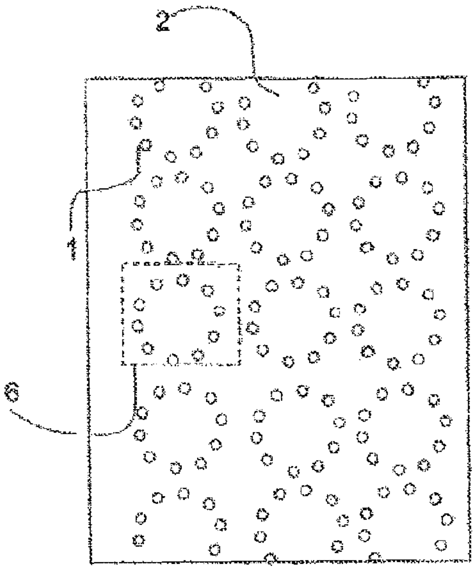
Figure 1E:
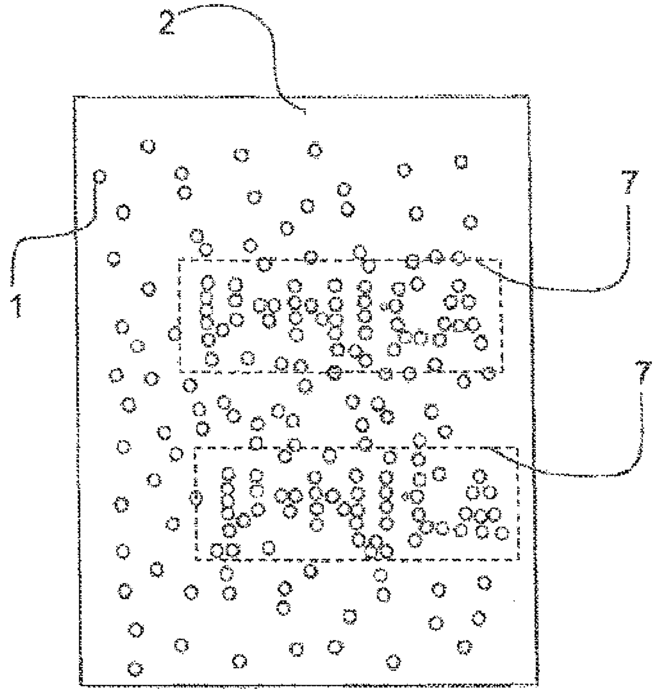

FIG. 1 shows an image area 2 covered with capsules 1 containing dyes. The variant according to FIG. 1*a* shows a random, that is to say substantially statistical, distribution of the colour capsules 3, whereas the other variants according to FIG. 1*b* to FIG. 1*d* show linear 4, meandering 5 or circular 6 arrangements of the capsules containing dyes. Lastly, FIG. 1*e* demonstrates a superimposition of a static distribution with a microlettering 7. All of these variants of the dye distribution in capsules can be produced by printing methods and can be used as starting material for the execution of the proposed method.

A capsule 1 according to the invention is a small ball containing a small quantity of liquid dyes or dispersed pigments advantageously of relatively uniform size, typically having a diameter from 2 μm to 15 μm, in particular 5 to 10 micrometers. The balls each contain colour bodies formed from a quantity of two, three or more different colours of the selected dye system.

Figure 7B:
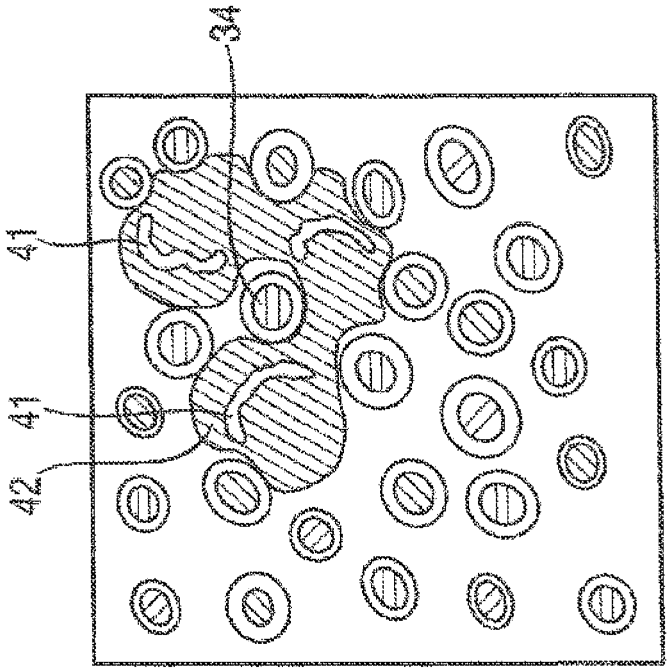
FIG. 7 shows a schematic illustration of a detail of encapsulated pigment distributions on a substrate a) before the opening of capsules and b) after the opening of capsules.
Figure 7A:
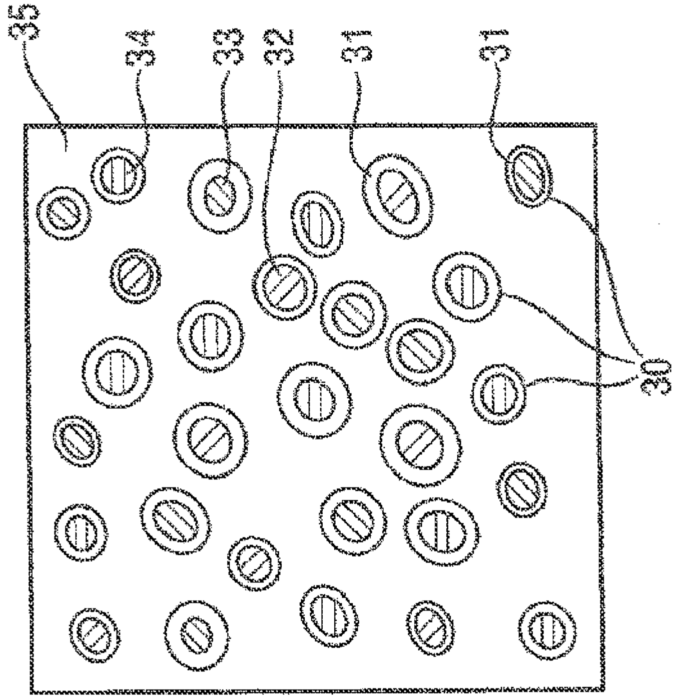

In FIG. 7*a*, such closed capsules 30 are illustrated in a detail from a corresponding data carrier. Between the capsules 30 is the material of the substrate, which is provided here with the reference sign 35. The capsules 30 all have a casing 31, in which the dispersed pigments or the liquid dye 32, 33 or 34 is enclosed. In FIGS. 7*a* and 7*b*, a dye 32 is illustrated by means of hatching pointing upwardly to the left, a dye 33 is illustrated by means of hatching pointing upwardly to the right, and a dye 34 is illustrated by means of horizontal hatching. The casing 31 seals the dye 32, 33 or 34 with respect to the surrounding environment, whereby it not only masks the dye visually for the human eye, but also protects it against bleaching, and is slightly transparent so as to be able to determine from the outside by means of the charting method the colour of the contained dye. The casing 31 of the capsule 30 has a uniform outer colour, for example white, so as to be able to easily identify the content by means of spectroscopy and so as to also be able to easily set a white colour tone as the colour of the substrate. The capsules 30 with their hard casing and their dye content are preferably produced by means of pearl polymerisation or suspension polymerisation, but also by coacervation or a centrifugation method. Suspension polymerisation is a method that has long been known (see also the series "Chemie, Physik and Technologie der Kunststoffe in Einzeldarstellungen" (Chemistry, Physics and Technology of Plastics in Individual Presentations), Hrg. K. A. Wolf, Springer Publishing House). With this method, colour bodies and the monomers required for the polymerisation are in an oil phase and radical starters for initiating the polymerisation are in the aqueous phase of the oil-in-water system. The polymerisation takes place at the interface between the two phases and leads to microencapsulated dyes in the desired size in accordance with the composition of the suspension and the reaction conditions. In the case of coacervation, the microcapsules are produced in a colloidal system, wherein the precipitation is initiated for example by a suitable pH shift. The microcapsules produced are typically dried in a further step by means of a spray-drying method and are therefore brought into a form that can be further processed. An application of the method is, for example, the production of pressure-sensitive microcapsules for self-copy papers. A method described in U.S. Pat. No. 2,712,507 is based on an aqueous salt water of a colloidal material, for example gelatine, which, in an oil phase suspended therein, for example consisting of trichlorodiphenyl, contains a dye. In the case of the above-mentioned disclosure, the microcapsules were formed by casting the heated coacervate mixture into a cooler salt solution. In a further processing sequence, the capsules are separated, cured and dried.

Lastly, the production of microcapsules can also be implemented using a centrifugal method, which for example is similar to spin-coating, which is suitable for the application of thin, very uniform films (see K. Norrman, A. Ghanbari-Siahkali and N. B. Larsen, *Annu. Rep. Prog. Chem., Sect. C: Phys. Chem.,* 2005, 101, 174-201), but, by contrast thereto, does not form planar layers, but casing structures, that is to say microcapsules. Successful practical application of such a method is the production of the chromophoric elements for what is known as E-paper.

Here, different type of capsules 30 can be used, which can withstand the subsequent lamination of the substrate. They can advantageously also convey the adhesion of the laminate. Due to an embodiment of the casing 31 in such a way that the casing 31 of the capsules 30 bursts at a predetermined laminate pressure and a predetermined temperature, this leads to a further difficulty for imitators to produce such a pressure product. Since the capsules 30 have been applied to or introduced over a pressure area, in particular in a single layer, they can then be further processed.

The casings 31 of the capsules 30 in particular may be single-shelled, that is to say may consist of a single layer that surrounds the colour material and contains said colour material internally in the capsule 30. In other embodiments, multi-shelled capsules are also possible, but are more complex to produce. The single-shelled capsule material is preferably not porous, that is to say it contains no absorbing substances acting specifically on the individual colour types, but the capsules 30 are designed identically for all at least two, in particular three, colour types.

Figure 2A:
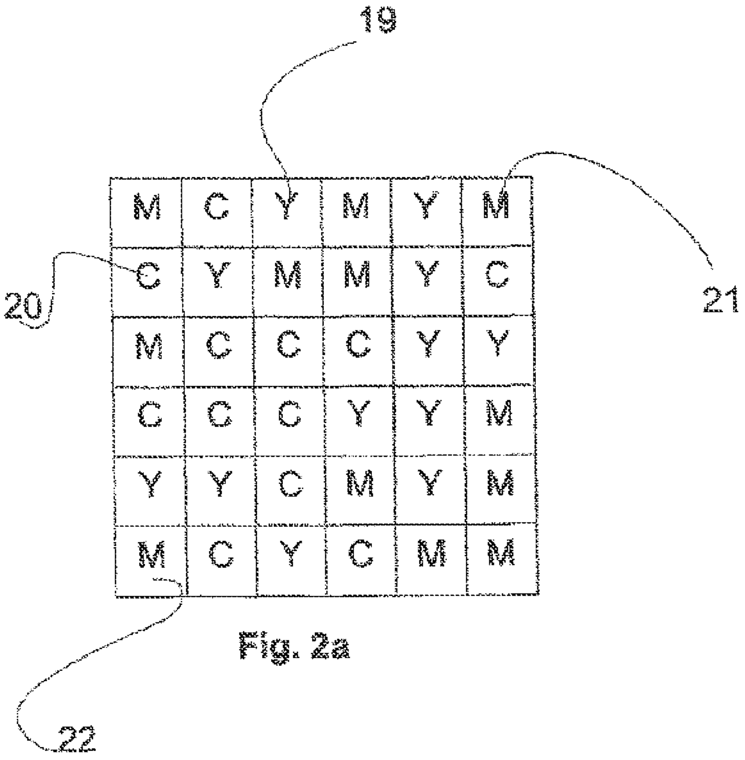
FIG. 2 in a) shows a schematic illustration of a division of an area into area elements with associated encapsulated colour bodies, in b) the activation of a capsule or colour body by means of a laser, and in c) the diffraction-induced constriction of the laser beam in the focal plane.
Figure 2B:
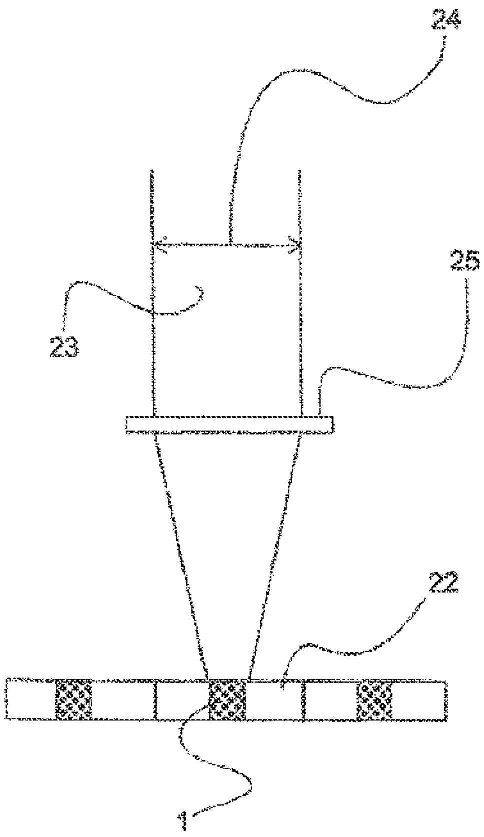
Figure 2C:
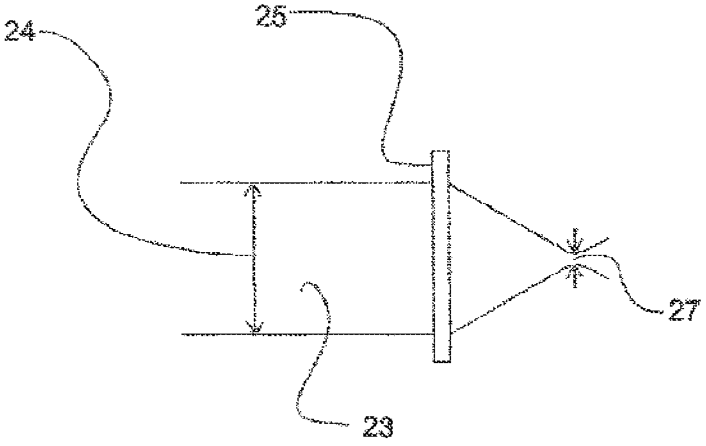

FIG. 2*a* is an abstract and schematic illustration of an image area that in this case 25 consists of surface elements 22 envisaged theoretically to a certain extent, which each contain just one capsule with liquid dye. In this example, the dyes comprise the three primary colours cyan [C] 20, magenta [M] 21, and yellow [Y] 19 in a statistical distribution, but with only one corresponding dye in each area element. FIG. 2*b* shows the profile of a laser beam 23 having a specific beam diameter 24. After passing a focusing element 25, this laser beam is focused to a diameter that allows complete irradiation of a dye-filled capsule 1 and of which the focus diameter is sufficiently small in order to open just one capsule 1 in each case, but irradiates said capsule substantially completely over the entire effective cross section. FIG. 2*c* shows the constriction of the laser beam 23 after diffraction when passing the focusing element 25 in the focal plane to a smallest diameter 27.

Figures 3A, 3B:
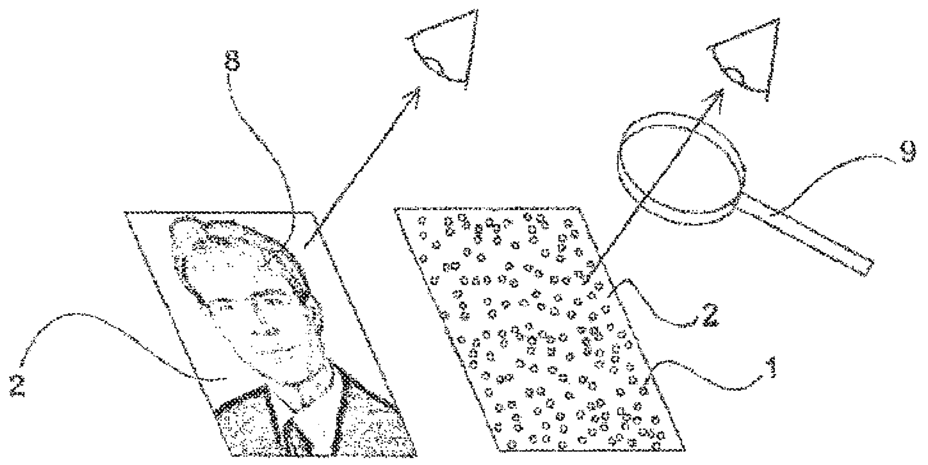
FIG. 3 shows the different appearances depending on the degree of magnification, wherein in a) the appearance with the naked eye is illustrated and in b) the appearance with a magnifying means is illustrated.

FIGS. 3*a* and 3*b* illustrate the difference between the macroscopic consideration or effect in FIG. 3*a* of an image 8, which has been produced over the image area 2 in accordance with a method of this invention, and microscopic consideration in FIG. 3*b*, which allows the pigment structure to be viewed using a magnifying device 9. The microscopic consideration of a selectively controlled pigment distribution allows verification of precisely this pigment distribution, since this distribution is combined with the actual individualising information of the image, that is to say, in a synergy, thus combines the fingerprint effect of the pigment distribution with the individualising information such that a considerable increase in the security standard is produced. In practice, this pigment distribution may also be a special raster, that can be assessed using a device (illustrated in the drawing as a magnifying glass), which can determine the colour effect through the capsule wall. A combination of a special raster with a random background distribution is also possible, such that the special raster can be verified without reference to a database, and the random background distribution can be verified by retrieving the corresponding identification information in a database. The microscopic structure can thus be checked both in a simple verification method (special raster) and in a superior security-relevant verification method (retrieval of the random distribution from the database).

Figures 4A, 4B:
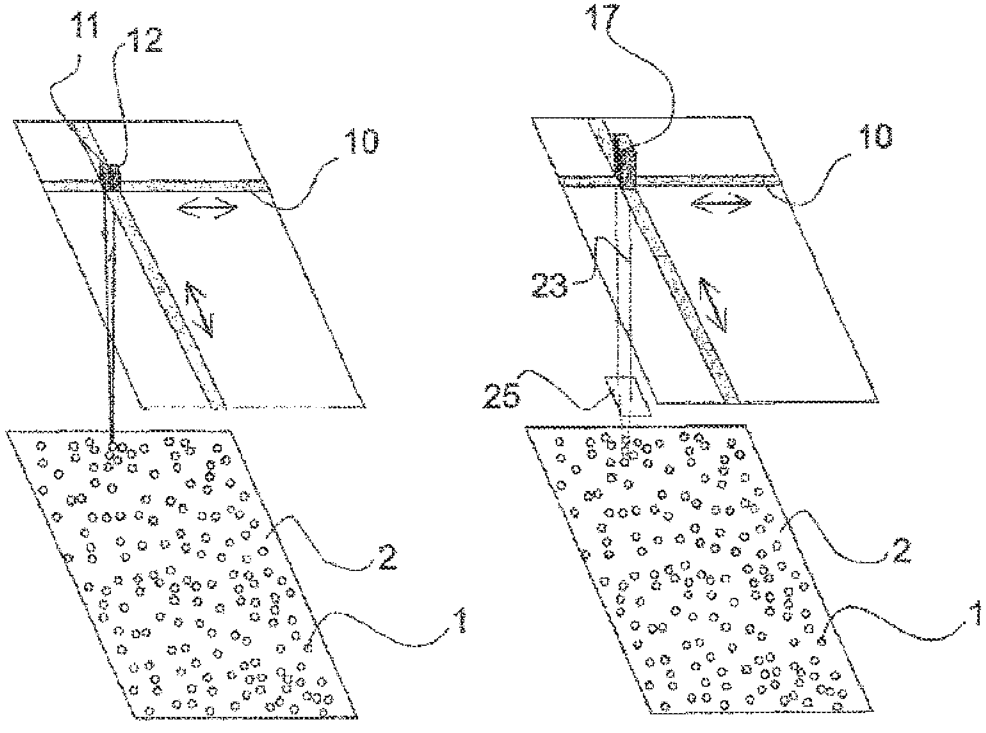
FIG. 4 shows the different steps for producing an image, wherein in a) the step of determining the position and type of capsules containing colour particles, and in b) the local influence of the capsules with the pigment particles by means of the laser is illustrated.

The drawings FIG. 4*a* and FIG. 4*b* demonstrate the two key method steps a and b, and optionally c, of this invention, consisting of the local and spectral analysis of the capsules 30 with the dyes with use of reflected light with the aid of a white light source 11 and a photoreceiver 12, which can be positioned with a two-path linear displacement unit 10 accurately to the micrometer above the sample or the image field (FIG. 4*a*, step a), and also consisting of a laser system 17, which decouples a laser beam 23 such that, in accordance with the data obtained from the apparatus according to FIG. 4*a*, said laser beam can contact each individual capsule with perfect precision (FIG. 4*b*, step b). Alternatively to the movement shown here of the white light source and of the photoreceiver and also of the laser optic, the substrate can also be moved by means of a two-path displacement unit. This alternative is not illustrated in FIGS. 4*a*/4*b*. It should also be mentioned with the illustration of the photoreceiver 12, that the structure of the photoreceiver has been illustrated in a simplified manner. It is not illustrated that the detector in the case of a white light excitation consists of a plurality of colour-specific components, which for example may consist of a plurality of photodiodes provided with differently coloured filters, or that the detector for example may also be a CCD sensor or a CMOS sensor with upstream multi-coloured filter (for example a Beyer filter), wherein, in the case of a Foveon CMOS sensor, it is possible to dispense with a colour filter. Furthermore, with the embodiment shown in the drawing of the exciting light source 11 in FIG. 4*a*, it is not illustrated that, in the case of an excitation in chronological sequence with light in different colours, the excitation light is generated by a plurality of differently coloured, narrow-band light sources, and the exciting light source therefore consists of a plurality of components. Furthermore, when focusing the laser beam in FIG. 4*b*, it should be noted that the diameter of the laser beam 24 is collimated by the focusing element 25 much more strongly to the smallest diameter 27 than illustrated in FIG. 4*b*, that is to say the drawing is not to scale. Likewise, an expansion of the laser beam after decoupling from the laser resonator is not illustrated separately, but is part of the laser system 17.

Figure 5:
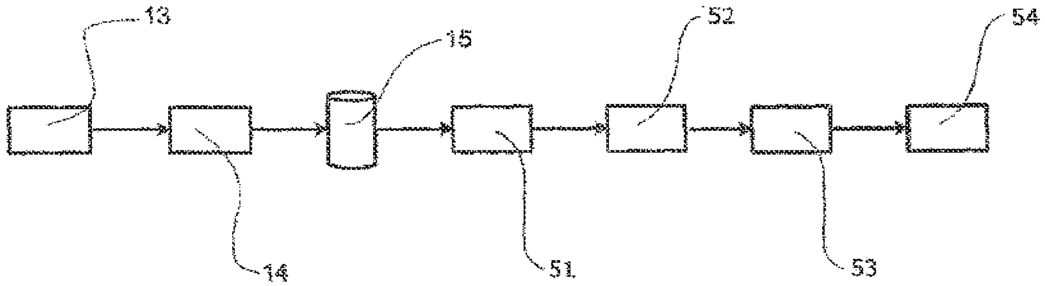
FIG. 5 shows individual steps of the proposed method in their sequence.

The entire workflow of the method in accordance with this invention is illustrated in FIG. 5. The key steps are the detection of the location and colour of the content of each individual capsule 13, production of the colour chart 14, storage of the data thus obtained in the form of a colour chart in a database 15, supply of the data or of the control protocol for the laser controller 51 in order to open the capsules, which in turn controls the process of the capsule opening 52 by means of the laser system 17, and supply of the data or of the control protocol for the laser controller 53, which in turn controls the process of the selective laser bleaching 54 by means of a UV laser system. The colour chart in the database is also used as a signature for a subsequent authentication of the security document via the image data thereof. Here, the production of the colour chart 14 can be used both to open the capsules and to bleach the capsules if the substrate therebetween has not shifted. Otherwise, the corresponding data have to be transformed.

If the bleaching is not carried out by the same light source, in particular the same UV laser, the further light source or the further light sources, where a number of bleaching light sources are used, is/are then advantageously coupled into the charting scanning optic in order to approach these positions accurately in a simple manner; however, as can be seen in FIGS. 7*a* and 7*b*, the colour elements are then distributed either as suspended colours or as distributed colour pigments over a relatively large area 42. The residues of the destroyed capsule casings 41 are also present in this area 42.

If, after opening one or more capsules 30 of the same colour (as in FIG. 7*b*) or of different colours (as not illustrated in the figures), a bleaching process is carried out, there are a number of possibilities for carrying out this step 54. On the one hand, the colour charting 14 can be used directly and the capsules 30 opened based on this can be irradiated. Only parts of the colour bodies existing around the destroyed casing 41 are therefore bleached. This can be limited to the space of the open capsule or to a predetermined radius. A further possibility is the use of the knowledge concerning the charting and the distances between individual colour capsules. A calculation method can then be stored in the controller, said calculation method calculating approximately the colour distribution after destruction of a capsule; this distribution of the colour bodies is dependent on the type of colour bodies and the suspended capsule content can be predicted over the diffusion time. Again, two sub-cases are possible. On the one hand, bleaching can also be carried out directly, also dependently of the opening of the capsules 30, such that the predetermined capsules are not initially opened as in FIG. 5 and the possible other predetermined capsule contents are then bleached, but the dye still distributing can be bleached directly in the surrounding environment of the casing capsule 41, such that the then partly bleached dye distributes itself. The other option is to wait for all distribution processes of the dye from an opened capsule for the areas 41 and the bleaching around the location of the previous capsule 30. The remaining colour value can then be calculated from the known capsule content and the bleaching intensity at the location of the capsule with the knowledge of unbleached portions of the colour bodies far away from the destroyed capsule. A third possibility for bleaching consists on the whole in appending a further charting step in order to chart the areas 42 in predetermined resolution so as to then, after this charting step, fully or partially bleach the entire or at least approximate area 42 with regard to the intensity of the bleaching, which may lead to a slightly more uniform colour image because substantially the complete colour area is processed. In this regard, these above-presented approaches correspond in reverse sequence to a remapping for defined bleaching, a calculation of the colour area distribution after the maturing time, that is to say the distribution of the colour bodies, or an execution of the bleaching process at the location of the burst capsule immediately or in a delayed manner in order to bleach a predefineable quantity of the colour.

Figure 6A:
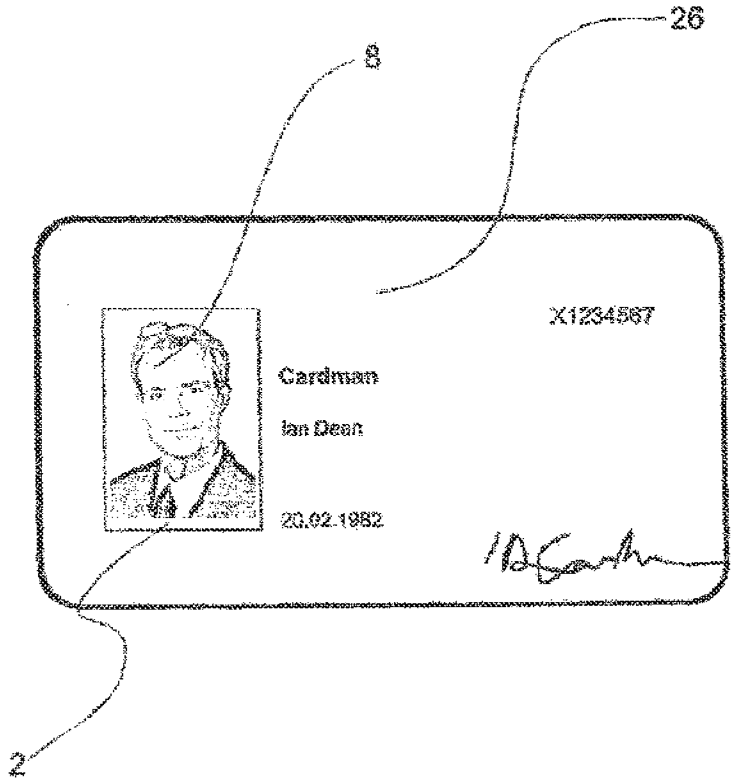
FIG. 6 shows exemplary identification cards.
Figure 6B:
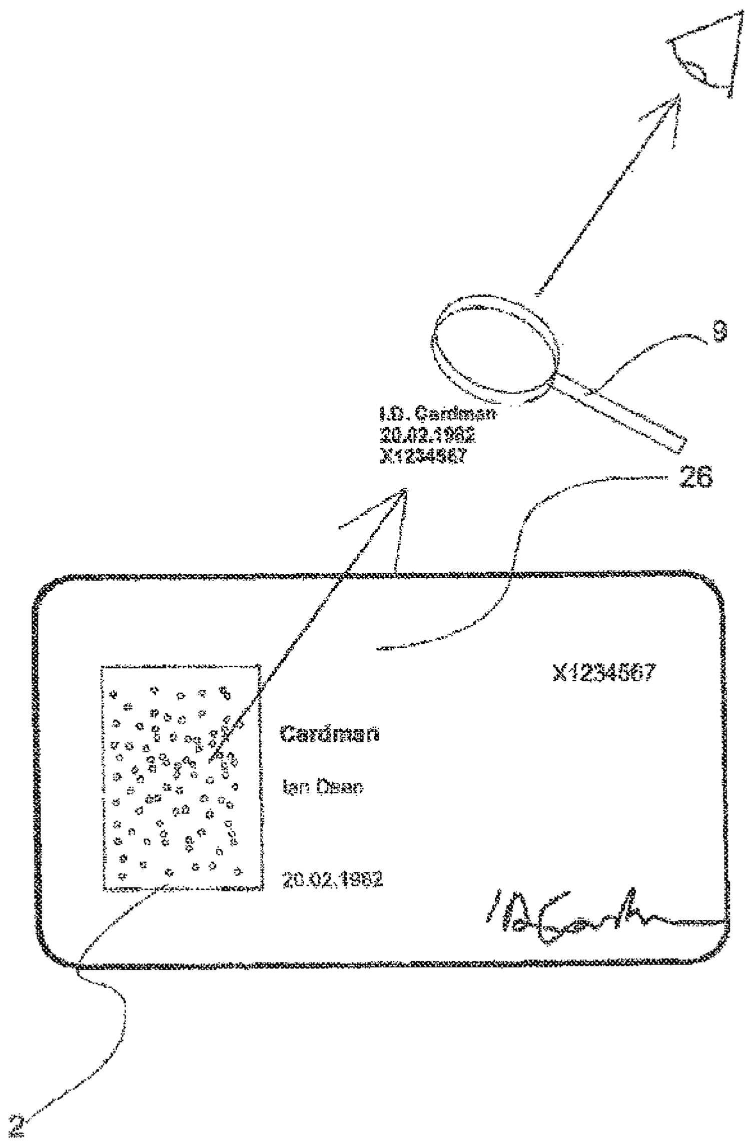

The drawings according to FIGS. 6*a* and 6*b* explain a possible application of this technology for portrait production on a card-shaped data carrier 26. The portrait produced in accordance with this invention additionally also contains additional data that are stored in the image field 2 on the basis of the colour and pigment distribution achieved by the printing of the capsules. This data for example may be personal data concerning the document owner (as illustrated in FIG. 6*b*), which are used in order to identify the document owner or, for example, provide possibilities for authenticating the document via a serial number or information concerning the statistical distribution of the particles in a specific area, etc.

The balls 30 of the desired colour tone are made to burst or crack, addressed individually, with the aid of an excitation beam, in particular a focussed light beam, for example of a laser, wherein this may be an infrared wavelength for example. This is illustrated in FIG. 7*b* such that a destroyed casing 41 is provided, from which the dye 42 has escaped. The spherical casing 31 itself or the dye content 32 are so intensely heated by the light beams or excited by an acoustic wave that the addressed capsules 30 burst and the dye (here the dye 32) runs out and, in the case of the three burst capsules, fills the hatched area 42. The heating may contribute to a rise of the surface tension, such that the capsule tears at the casing similarly to an inflated balloon and the content thus exits. The propagation of the liquid dye is limited upwardly and downwardly with respect to the drawing plane, normally with respect to a base substrate below and a laminate film above. The surrounding environment of the capsules 30, this being a binder or paper (not illustrated in FIG. 7), and the outer casing 31 of the capsules 30 are designed such that the dye 32 distributes there effectively in a capillary manner or as a result of the mechanical pressure present. This process taking place over a period of time then leads to the embodiment illustrated in FIG. 7*b*, specifically the fact that the dye 32 can reach in a capillary manner at least half the distance to the capsule 30 of the same colour. In addition, it will wet and dye its own capsule casing 41 open in the meantime. The excitation and destruction of a number of capsules 30 of a predetermined dye type (here 32) would thus allow a virtually complete area fill 42 with this colour tone, wherein the capsules of other dyes (here the horizontally hatched capsules with the dye 34 surrounded on almost all sides) still remain closed and themselves produce a white impression.

The advantage of the encapsulation, besides the possibility of producing intensive tones, also lies in the fact that it is sufficient to be able to use favourable light sources. However, for specific focusing for example to 2 μm, it is still advantageous to use coherent or monochromatic light. Favourable light sources is to be understood to mean the use of a single laser in contrast to the three lasers in the methods according to the prior art.

The aforementioned bursting of the capsules can also take place within a laminate. In this way, the area internally in the laminate can also be filled completely with a colour. If, in such a case, all capsules 30, for example in the CYM system, are opened, an area that is deep black in principle is produced. Accordingly, the mixed colours can also be produced directly in full tone.

The method is applied in order to personalise security documents for example, and it provides an additional possibility for significantly increasing the level of protection against forgery. In this exemplary application, the precise detection of the colour regions is therefore no longer merely used as in the previous application to improve the printing method in terms of the technical deficiencies thereof. The colours can also be arranged in a random pattern, alternating from blank to blank, since this can be identified by the corresponding control unit. A blank can therefore only then be printed if, before the exposure with the laser, the method according to a. has been used, since otherwise a false-colour image would be produced. Blanks would therefore be unusable for counterfeiting unless the counterfeiter were to use a microscopic analysis according to method a. A particular possibility of making a fake document immediately identifiable to the eye of the untrained observer lies in additionally changing for example in the case of personal papers the regularity of the pseudo-statistical rearrangement of the colour pattern for example in the region in which the face of the portrait is normally arranged, in such a way that the false colour representation changes and for example the word “fake” is legible in colour unless the precise microposition of the colour pattern is taken into account.

In accordance with document WO-A-0115910, it is possible to selectively produce the colour effect of pigment mixtures, consisting of yellow, cyan-coloured and magenta-coloured pigments, by irradiating them with the wavelengths of a laser complimentary to the pigment colour and thus bleaching them. A red, green and blue laser are therefore necessary for complete exposure. With this method, a plurality of pigment grains of different colouration are always located within the focus of the laser beam, which simultaneously corresponds to the desired pixel size, that is to say for example 50 μm for a resolution of 500 dpi, since these pigment grains are much smaller, which may be advantageous when bleaching in order to achieve mixed tones. However, only precisely those pigments that absorb the laser radiation of the respective used wavelength are bleached. Yellow pigments therefore absorb the blue wavelength and are bleached. The other cyan-coloured and magenta-coloured pigments retaining their colouration mix with one another when viewed under reflecting light subtractively to give blue. Blue irradiation thus produces a blue shade. The red and green laser radiation behaves similarly when it contacts the same pigment mixture. In this embodiment, the particle sizes of the pigments are in the region of 10 μm. The position of the pigments can therefore be detected accurately to 2 μm in the same manner as described there using a microscopic scanning method. Their diameter is also suitable to address them individually with a UV laser beam having a focus of approximately 10 μm, since said mechanical linear displacement units with location accuracy to 2 μm can be purchased (Heinrich Wolf, Eutin). All 3 types of colours can be bleached with just one wavelength in UV (typically 355 nm). This embodiment therefore provides the possibility of working with just one laser instead of with 3 lasers, since the individual colour components of the pigments are no longer addressed via the wavelength of the light, but via the location. A significant cost reduction of the technical system is therefore achieved as a result of the transition to just one wavelength.

Figures 8, 8A, 8B, 8C:
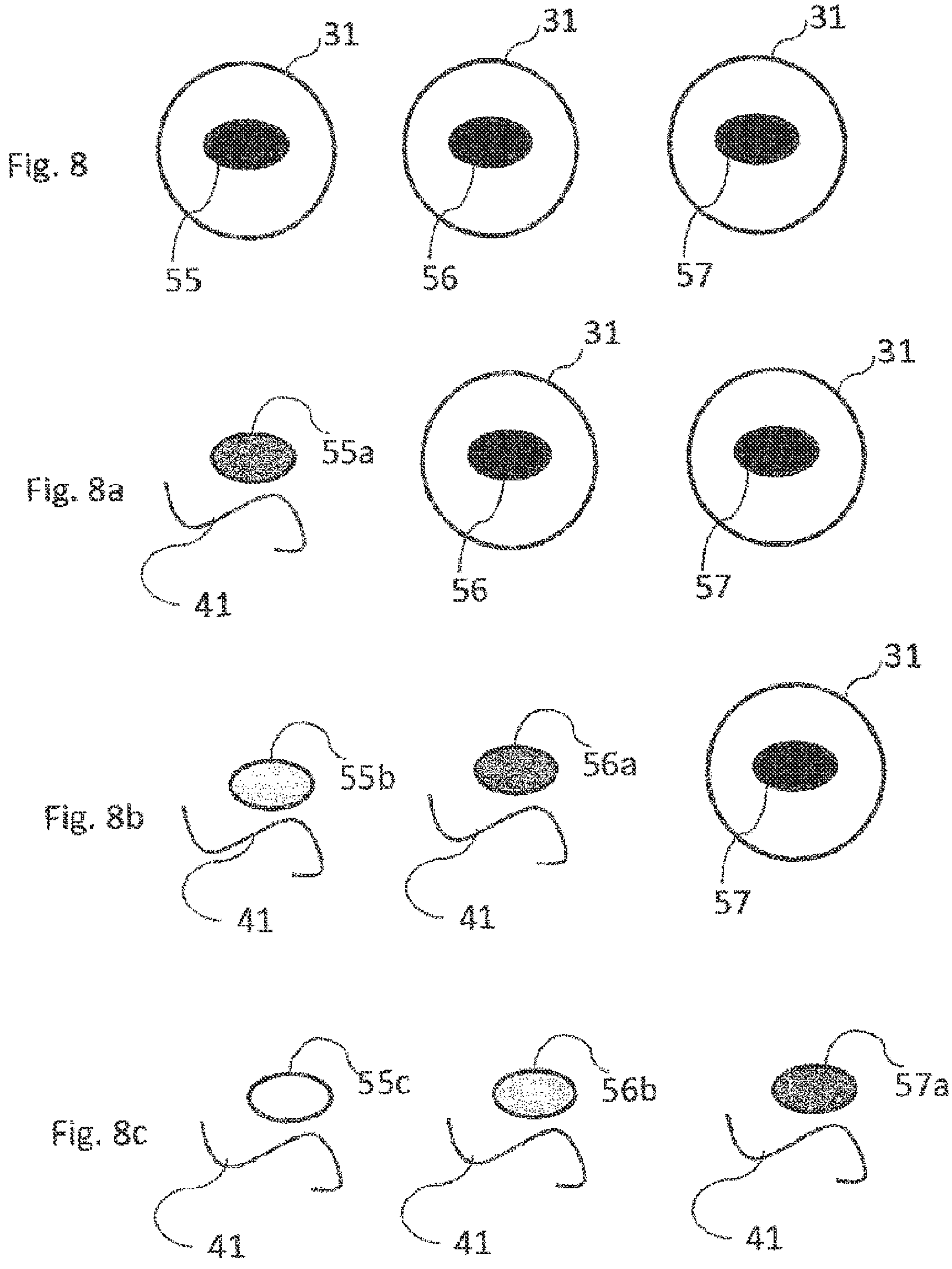
FIG. 8 shows an illustration of a colour tuple consisting of three different colours in each case in the encapsulated state.
FIG. 8*a* shows a colour tuple with the colour body that has to be bleached to the greatest degree in the released state after a first exposure.
FIG. 8*b* shows a colour tuple with two released colour bodies, wherein the first has been bleached a second time and the second has been bleached for the first time.
FIG. 8*c* shows a colour tuple with three released colour bodies, wherein the first has been bleached three times, the second has been bleached twice and the third has been bleached for a first time.

In accordance with a development of the embodiment described in FIG. 7, it is likewise possible to release the dyes 32, 33 and 34 in the capsules 30 at different times. A distinction is therefore made between the bleaching of the dyes over the time axis by different, yet individually controllable, exposure times (FIG. 8), which leads to a further possibility for influencing the printed image. As a result of the local selection of the capsules 30, that is to say the previous spectroscopic analysis of the colour present at a specific location, a decision is made to open predetermined capsules in a single process step. After a specific period of bleaching of dye that has already been released, a further, second colour component is bleached by laser irradiation at a location already released from the destroyed capsule 40, whereas colour components still located in other capsules 30 at the same location are protected against the bleaching process by the casings 31 of the capsules 30. Steps b and c during the image production process are carried out in practice in nested form to a certain extent. As already mentioned above, the bleaching can be undertaken by including a focusing of the bleaching beam matched to the discharge regions or a broader beam for the processing of larger portions of the area 42, the intensity of said beam then being insufficient however to destroy other capsules. In one embodiment, a predetermined bleaching light energy is thus fed, which is still insufficient to carry out the bleaching in the end state. This is because, once this first bleaching energy has been fed, a second excitation energy is diverted onto this location and, in a combined process step, immediately thereafter with amended focus size opens another capsule 30 comprising a different dye component located at this location and then again with adapted focus size further bleaches the dyes, which have already escaped, of a capsule 30 opened earlier. The dye of the capsule opened first is thus subsequently bleached by means of this capsule opening energy for a second capsule 30. In the case of a multi-colour system, these steps can then be applied again a third or fourth time in order to open further capsules 30. As these further capsules 30 are opened, the irradiated energy will simultaneously further bleach the used dyes of the previously opened capsules, wherein the bleaching energy behaves in a cumulative manner. The dyes 32, 33, 34 present at this location will then reach the ultimately necessary degree of bleaching once all provided capsules 30 have been opened and the dyes 32, 33 and 34 contained therein have been bleached and in particular bleached to different degrees. Capsule opening and bleaching are therefore intermittent processes, which follow one another directly a number of times, wherein the focus size of the laser, the power thereof and, lastly but not necessarily, the frequency thereof has to be adapted in each case.

The practical significance of this staggered bleaching process is that, for the production of a natural image, colour tones from the entire colour space have to be represented. This is only possible with exposure times of different length of a colour body. Since a plurality of colour bodies are always present at the same time in the focus of the laser beam, this is advantageously achieved in that the colour body to be bleached to the greatest extent is released first. This is followed by the colour body that has to be bleached to the second greatest extent, and so on (see FIG. 8).

This approach will be explained on the basis of an example. At a specific location, the colour tone having the coordinates 38, 253, 107 in the RGB system is to be represented. This corresponds to a green. In the CYM system, the colour vector as (117, 148, 2) would ensue (255*0.459; 225*0.58; 255/0.008) in accordance with a known conversion formula. In order to simplify the calculation, the energy value is scaled in bit values and not in Joules, and it is assumed that two dyes escaping from capsules shadow one another by 50% at an identical location; by contrast, three dyes shadow one another by 66%. These assumptions correspond to the setting of calculation constants and can be adapted in accordance with colour. In the CYM system, C would then have to be bleached from full tone with 255−117=138 energy values. Y would have to be bleached from full tone with 255−148=107 energy values. M would lastly have to be bleached from full tone with 255−2=253 energy values. In total, (138+107+153=) 498 energy values would therefore have to be introduced. The capsules that contain the M dye would have to be opened first at this location, because these have to be bleached to the greatest extent; followed by the capsules provided with the C dye and lastly by the capsules containing the dye Y.

If the individual dye could be bleached by an above-mentioned bit value within a nanosecond, which is assumed here by way of example for simple calculation purposes, the energy flow can be divided as follows. The opened magenta capsules first receive bleaching light for (253−138) nanoseconds=115 nanoseconds. The cyan capsules are then to be opened and the dye is to be left for a certain period of time so as to distribute in a capillary manner. After the distribution, it is mixed with the magenta dye, which has already been bleached beforehand. The two dyes shadow one another in accordance with the above assumption by 50%. They must therefore be bleached jointly for ({138−107 nanoseconds}*2=) 62 nanoseconds. The magenta dye is then bleached by 115+62/2=146 colour tone values, whereas the cyan dye is bleached by 62/2=31 colour tone values. Lastly, the capsules to be bleached to the smallest extent, specifically the yellow capsules, are opened. These are to be bleached for 107 nanoseconds*3=321 nanoseconds, because the dyes then shadow one another by two thirds and the time therefore has to be trebled. After adding the bleaching effect of said third bleaching step, M is then bleached for 115+62/2+321/3=253 stages, C is then bleached for 62/2+321/3=138 stages, and Y is lastly then bleached for 321/3=107 stages. The above-mentioned original requirements for the selected green dye are therefore provided. In total, 115+62+321=498 nanoseconds of exposure should therefore be applied. The general formula is as follows: $T_3=K1(B_3-B_2)$; $T_2=K_2(B_2-B_1)$; $T_1=K_3*B_1$, wherein T is the time, B is the necessary bleaching value, and the index 3/2/1 stands for the component to be bleached to the greatest extent/middle extent/weakest extent. In a simple exemplary embodiment, the scaling constant K can be selected as $K_1=1*K$, $K_2=2*K$ and $K_3=3*K$.

If the laser that is used for bleaching (a UV laser in the presented exemplary embodiment) is also intended to open the capsules), it should possibly be ensured that either the dye in the undestroyed capsules is not also bleached beforehand during the bleaching process of the dyes already released, or that the capsule wall 31 is designed such that it protects the internally arranged dyes 32, 33 and 34.

The casing residues 41 and the dead-bleached colour bodies tend in some circumstances to remain as yellowish artefacts. Here, $TiO_2$ nanoparticles may in the meantime be brought into contact with the substrate, since such $TiO_2$ nanoparticles behave as a semiconductor under the action of energy-rich light (the UV proportion in sunlight is generally sufficient for this) and thus have a high redox potential. This effect is used for example in a solar cell, what is known as a Grätzel cell, produced commercially by G24 Innovations, or has been proposed for wastewater purification (for example see D. Meissner, Photocatalytic and Photoelectrochemical Wastewater Purification, 4th Ulmer Electrochemical Days, 1997). The redox potential is sufficient in order to lighten the residues, having a yellowish effect, of bleached dyes of the areas 42 or the capsule residues 41. The photocatalytic effect with titanium dioxide in order to increase the whiteness of the background forms part of the aforementioned "finishing" process. Here, the $TiO_2$ nanoparticles can be applied for example to a drum, over the lateral surface of which the substrate is drawn under a specific bias. With a light source acting on this contact area between the substrate and lateral surface with UV light, the proportion, having a yellowish effect, of bleached colour areas 42 and of burst casing elements 41 can be whitened. Since the $TiO_2$ nanoparticles do not remain in the substrate, the produced product remains light-resistant. A variant that is more efficient from a photochemical point of view is the insertion of the titanium dioxide nanopowder into the printing ink containing colour capsules, wherein, in this case but after the activating exposure of the $TiO_2$ with UV light, the developed pattern, sign, symbol or image has to be covered by an efficient UV filter, preferably in the form of a laminate film, such that the oxidative effect of the $TiO_2$ in sunlight can no longer take place and a disadvantageous premature fading of the image caused by this chemical process is avoided.

LIST OF REFERENCE SIGNS

1 capsule
2 substrate, image area
3 region with statistical distribution of the capsules
4 region with regular distribution of the capsules, linear
5 region with regular distribution of the capsules, meander
6 region with regular distribution of the capsules, circular arrangements
7 region with regular distribution of the capsules, microlettering
8 image, symbol, lettering
9 magnifying device, illustrated symbolically as a magnifying glass
10 x/y linear displacement unit
11 white light source
12 light sensor, photoreceiver
13 detection of the capsules containing dye as a colour element as a function of the spatial coordinates
14 storage of the data in the form of a colour chart
15 storage in a database
17 laser system
19 area element comprising capsule and yellow primary colour dye
20 area element comprising capsule and cyan primary colour dye
21 area element comprising capsule and magenta primary colour dye
22 area element
23 laser beam
24 beam diameter of 23
25 focusing element, for example lens, grid
26 card-shaped data carrier
27 diameter of the laser beam in the focal plane
30 capsule
31 capsule casing
32-34 liquid dye
35 substrate
40 capsule
41 open capsule casing
42 distributed dye
51 laser controller for capsule opening process
52 laser controller for the bleaching laser
53 capsule opening
54 laser bleaching
55 colour body having the highest bleaching requirement
56 colour body having the second-highest bleaching requirement
57 colour body having the lowest bleaching requirement

The invention claimed is:

1. A method for producing a multi-coloured sign, pattern, symbol and/or image on a substrate with, arranged thereon, capsules containing colour bodies consisting of dyes or pigments, wherein, under the action of an excitation beam, the colour effect is released, wherein different capsules having at least two different colour effects are arranged on and/or in the substrate, said method comprising the following method steps;

as a preliminary step, generating a data set identifying the location of coloured capsules on and/or in the substrate and storing said data set in a database, and thereafter, a producing a colour chart, in which the potential individual colour effect of individual capsules containing individual colour bodies is contained as a function of the spatial coordinates thereof on and/or in the substrate;

b spatially resolved radiation, which opens the colour effect of colour bodies just of individual capsules and releases said dyes or pigments by means of an excitation beam, on the basis of the colour chart in order to produce a resultant colour effect of the released dyes or pigments.

2. The method according to claim 1, wherein steps a and b are carried out in the same device and without intermediate manipulation or displacement of the substrate.

3. The method according to claim 1, wherein the different colour bodies are arranged on and/or in the substrate in a layer, preferably in a single layer, and are distributed substantially randomly as a function of the spatial coordinates; or in that the different colour bodies are arranged on and/or in the substrate in a layer, preferably in a single layer, and are arranged substantially regularly in a microscopic pattern, the microscopic pattern possibly being an arrangement of straight or undulating lines, basic patterns or microlettering.

4. The method according to claim 1, wherein, to carry out step a, the surface of the substrate is scanned, preferably with use of a linear displacement unit comprising a white light source and/or detection unit arranged in the vicinity, white light or a sequence of light flashes of different colours preferably being irradiated as a function of the spatial coordinates and the reflected or transmitted light being analysed spectrally as a function of the spatial coordinates, preferably by establishing the signal exclusively at least at two, preferably at least at three, discrete frequencies, which make it possible to distinguish the different dyes arranged in the substrate, preferably with use of a photodiode, and by determining the position and the colour effect of individual dyes in a data matrix forming the colour chart.

5. The method according to claim 1, wherein, to carry out step b, the surface of the substrate, preferably with use of a linear displacement unit comprising a laser source arranged in the vicinity, is scanned by directing the laser source on the basis of the colour chart to individual capsules comprising dyes in order to release the colour effect thereof individually; and/or to carry out the step b, the laser optic is stationary and the substrate is moved with the aid of a linear displacement unit such that the laser source scans over the substrate on the basis of the colour chart, and, in so doing, the laser beam contacts individual capsules comprising dyes so as to release the colour effect thereof individually.

6. The method according to claim 1, wherein, in a data processing unit starting from the colour chart, established in step a, for the sign, pattern, symbol and/or image, a process protocol for the excitation beam in step b is produced, said process protocol receiving the information as to which individual colour bodies, as a function of the spatial coordinates, are to be locally influenced deliberately by the laser in terms of their colour effect in order to produce a specific macroscopic colour effect for the sign, pattern, symbol and/or image, and in particular which individual colour bodies are to be destroyed by the laser in terms of their colour effect.

7. The method according to claim 1, wherein, in the case of an incorrect or absent evaluation of the colour chart for the control of the excitation beam, a readable marking appears on a data carrier and indicates a forgery or marks the image as faulty.

8. The method as set forth in claim 1, wherein different capsules have three different colour effects.

9. The method as set forth in claim 1, wherein the excitation beam is a laser beam.

10. The method as set forth in claim 1, wherein the excitation beam is one of an IR laser and a UV laser.

11. The method as set forth in claim 1, wherein the excitation beam is at a single frequency.

12. A method for producing a multi-coloured sign, pattern, symbol and/or image on a substrate with, arranged thereon, capsules containing colour bodies consisting of dyes or pigments, wherein, under the action of an excitation beam, the colour effect is released, wherein different capsules having at least two different colour effects are arranged on and/or in the substrate, said method comprising the following method steps;

a producing a colour chart, in which the potential individual colour effect of capsules containing individual colour bodies is contained as a function of the spatial coordinates thereof on and/or in the substrate;

b spatially resolved radiation, which opens the colour effect of colour bodies just of individual capsules and releases said dyes or pigments by means of the excitation beam, on the basis of the colour chart in order to produce a resultant colour effect of the released dyes or pigments, wherein, either after step b as a capsule opening step or intermittently with step b after each individual opened capsule or after a predefined number of opened capsules, a step c follows either as a further complete bleaching step or intermittently after said opening process of one or more capsules, in which the colour bodies escaped from the opened capsules are fully or partially bleached using the same excitation beam or a different excitation beam, in particular using a UV laser beam, this step c optionally being achieved by a) guiding the excitation beam in the form of a bleaching beam over the entire colour area or parts thereof by calculating the colour area covered by the colour bodies as a result of distribution, or b) directing the excitation beam in the form of a bleaching beam onto the region of the respective opened capsule(s), said charting optionally being usable, and the bleaching step possibly being carried out at a predetermined interval after the opening of the capsule in order to reach all or some of the escaping colour bodies with the bleaching step 13. The method according to claim 12, wherein, after step b or optional step c, the substrate is guided over a bleaching agent carrier, in which bleaching agent carrier a bleaching agent performing an oxidation process is provided, the contact area of the bleaching agent carrier with the substrate being acted on by an excitation light such that the bleaching agent bleaches at least the casing residues of the opened capsules and alternatively, the light-activatable bleaching agent can be attached to the substrate containing the colour bodies, the developed pattern, sign, symbol or image being covered after the bleaching process with a suitable light-absorbing filter.

14. A method for producing a multi-coloured sign, pattern, symbol and/or image on a substrate with, arranged thereon, capsules containing colour bodies consisting of dyes or pigments, wherein, under the action of an excitation beam, the colour effect is released, wherein different capsules having at least two different colour effects are arranged on and/or in the substrate, said method comprising the following method steps;

a producing a colour chart, in which the potential individual colour effect of capsules containing individual colour bodies is contained as a function of the spatial coordinates thereof on and/or in the substrate;

b spatially resolved radiation, which opens the colour effect of colour bodies just of individual capsules and releases said dyes or pigments by means of the excitation beam, on the basis of the colour chart in order to produce a resultant colour effect of the released dyes or pigments, wherein the individual capsules have a mean diameter in the range of 5-15 μm, preferably in the range of 8-12 μm, and in that they are arranged substantially on the substrate or in the substrate, preferably individually separated laterally, in particular preferably in such a way that the normal projection of the mean distance into the printed layer plane between two capsules is equal to or greater than the mean diameter of the capsules, the beam diameter of the laser beam in step b preferably being no more than twice as large as the mean diameter of the capsules, the beam diameter of the laser beam in step b particularly preferably lying in the range of 5-20 μm, preferably in the range of 8-15 μm, particularly preferably in the range of 8-12 μm.

* * * * *